United States Patent
Rizkin et al.

(10) Patent No.: US 6,932,496 B2
(45) Date of Patent: Aug. 23, 2005

(54) LED-BASED ELEVATED OMNIDIRECTIONAL AIRFIELD LIGHT

(75) Inventors: Alexander Rizkin, Redondo Beach, CA (US); Robert H. Tudhope, Rancho Palos Verdes, CA (US)

(73) Assignee: Farlight LLC, Wilmington, CA (US)

( * ) Notice: Subject to any disclaimer, the term of this patent is extended or adjusted under 35 U.S.C. 154(b) by 6 days.

(21) Appl. No.: 10/417,412

(22) Filed: Apr. 16, 2003

(65) Prior Publication Data

US 2003/0193807 A1 Oct. 16, 2003

Related U.S. Application Data

(60) Provisional application No. 60/373,026, filed on Apr. 16, 2002.

(51) Int. Cl.[7] ................................................. F21V 7/00
(52) U.S. Cl. ........................ 362/299; 362/327; 362/800; 362/183
(58) Field of Search ........................ 362/299, 300–302, 362/307–309, 800, 183, 326, 327

(56) References Cited

U.S. PATENT DOCUMENTS

| | | | | |
|---|---|---|---|---|
| 1,384,659 A | * | 7/1921 | Benard | ........................ 362/309 |
| 5,335,157 A | * | 8/1994 | Lyons | ......................... 362/297 |
| 6,312,143 B1 | * | 11/2001 | Drazic et al. | ............... 362/268 |

* cited by examiner

Primary Examiner—Sandra O'Shea
Assistant Examiner—Ali Alavi
(74) Attorney, Agent, or Firm—Gehrke & Associates, S.C.; Lisa A. Brzycki

(57) ABSTRACT

A light emitting apparatus includes a light source, a light transformer, a hemispherical optical window, a circuit and a base. The light transformer includes a truncated hollow conical reflector, a curved reflective surface, and an optical element. The conical reflector has a truncated end facing the light source and a cone base opposite the truncated end. The conical reflector axis is coincident with a light source axis, and light passes through an opening on the truncated end. The curved reflective surface is between the truncated end and the cone base. The surface reflects light from the light source in a limited angle omnidirectional pattern with precalculated intensity distribution. The optical element is adjacent the cone base in a plane perpendicular to the conical reflector axis, and disperses the light passing through the truncated hollow cone reflector.

17 Claims, 2 Drawing Sheets

LED-BASED ELEVATED OMNIDIRECTIONAL AIRFIELD LIGHT

CROSS-REFERENCE TO RELATED APPLICATIONS

This application is a continuation-in-part application of U.S. Provisional Ser. No. 60/373,026 filed Apr. 16, 2002.

BACKGROUND OF THE INVENTION

1. Field of the Invention

The present invention relates generally to illumination and airfield lighting. In particular, the present invention relates to runway and taxiway elevated edge lighting, heliport perimeter lighting, and the like.

2. Discussion of the Related Art

U.S. governmental and international specifications identify various requirements including spatial luminous intensity distribution, chromaticity, structural integrity, etc. For example, the Federal Aviation Administration Advisory Circular 150/53454-46B identifies the photometric specification for an elevated taxiway edge light (L-861T) as follows:

Omnidirectional pattern in horizontal plane;
2 candela average intensity between 0 and 6 degrees above horizon in vertical plane;
0.2 candela intensity in remaining hemisphere; and
Aviation blue color.

Conventional fixtures, which are produced by approximately twelve manufacturers around the world, have remained unchanged in their basic design for over 40 years. These conventional fixtures include incandescent bulbs (30 or 45 watt) as a light source and a blue glass dome incorporating a Fresnel lens as an optical element.

Unfortunately, this conventional design is very inefficient in that a low percentage of the consumed energy is converted into useful light. Additionally, this conventional design results in high maintenance costs (e.g., the cost associated with relamping due to the relative low bulb lifetime of 1,000 hours).

What is needed, therefore, to overcome these limitations found in conventional designs is the application of solid-state technology (e.g., light emitting diodes) using an optical device (light transformer) for omnidirectional light reflection.

SUMMARY OF THE INVENTION

The present invention includes a light transformer for directing part of the light emitted by a light source in a limited angle omnidirectional pattern with precalculated intensity distribution while the remaining emitted light is dispersed across a hemisphere. The transformer includes a truncated hollow conical reflector, a curved reflective surface, and an optical element. The truncated hollow conical reflector has a truncated end facing the light source and a cone base opposite the truncated end, wherein a conical reflector axis is coincident with a light source axis, and light passes through an opening on the truncated end. The curved reflective surface is located between the truncated end and the cone base. The surface reflects light from the light source in the limited angle omnidirectional pattern with precalculated intensity distribution. The optical element is located adjacent the cone base in a plane perpendicular to the conical reflector axis. The optical element disperses the light passing through the truncated hollow cone reflector.

According to another aspect of the invention, a light emitting apparatus includes a light source, a light transformer, a hemispherical optical window, a circuit and a base. The light transformer includes a truncated hollow conical reflector, a curved reflective surface, and an optical element. The conical reflector has a truncated end facing the light source and a cone base opposite the truncated end. The conical reflector axis is coincident with a light source axis, and light passes through an opening on the truncated end. The curved reflective surface is between the truncated end and the cone base. The surface reflects light from the light source in a limited angle omnidirectional pattern with precalculated intensity distribution. The curved reflective surface includes a plurality of curved circular facets, each of the facets reflecting light from different angles into the same limited angle omnidirectional pattern with precalculated intensity distribution as a superposition of rays reflected from different facets. The optical element is adjacent the cone base in a plane perpendicular to the conical reflector axis, and disperses the light passing through the truncated hollow cone reflector. The light transformer is seated within the hemispherical window and the optical window transmits light to the exterior of the light emitting apparatus. The circuit connects the light source to an outside power source. The base houses the power source, the hemispherical optical window and the circuit.

According to yet another aspect of the invention, a light emitting apparatus includes a light source, a light transformer, a hemispherical optical window, a circuit and a base. The light transformer includes a truncated hollow conical reflector, a curved reflective surface, and an optical element. The conical reflector has a truncated end facing the light source and a cone base opposite the truncated end. The conical reflector axis is coincident with a light source axis, and light passes through an opening on the truncated end. The curved reflective surface is between the truncated end and the cone base. The surface reflects light from the light source in a limited angle omnidirectional pattern with precalculated intensity distribution. The optical element is adjacent the cone base in a plane perpendicular to the conical reflector axis, and disperses the light passing through the truncated hollow cone reflector. The light transformer is seated within the hemispherical window and the optical window transmits light to the exterior of the light emitting apparatus. The circuit connects the light source to an outside power source. The base houses the power source, the hemispherical optical window and the circuit.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

DETAILED DESCRIPTION OF THE PREFERRED EMBODIMENTS

Figures 1A, 1B:
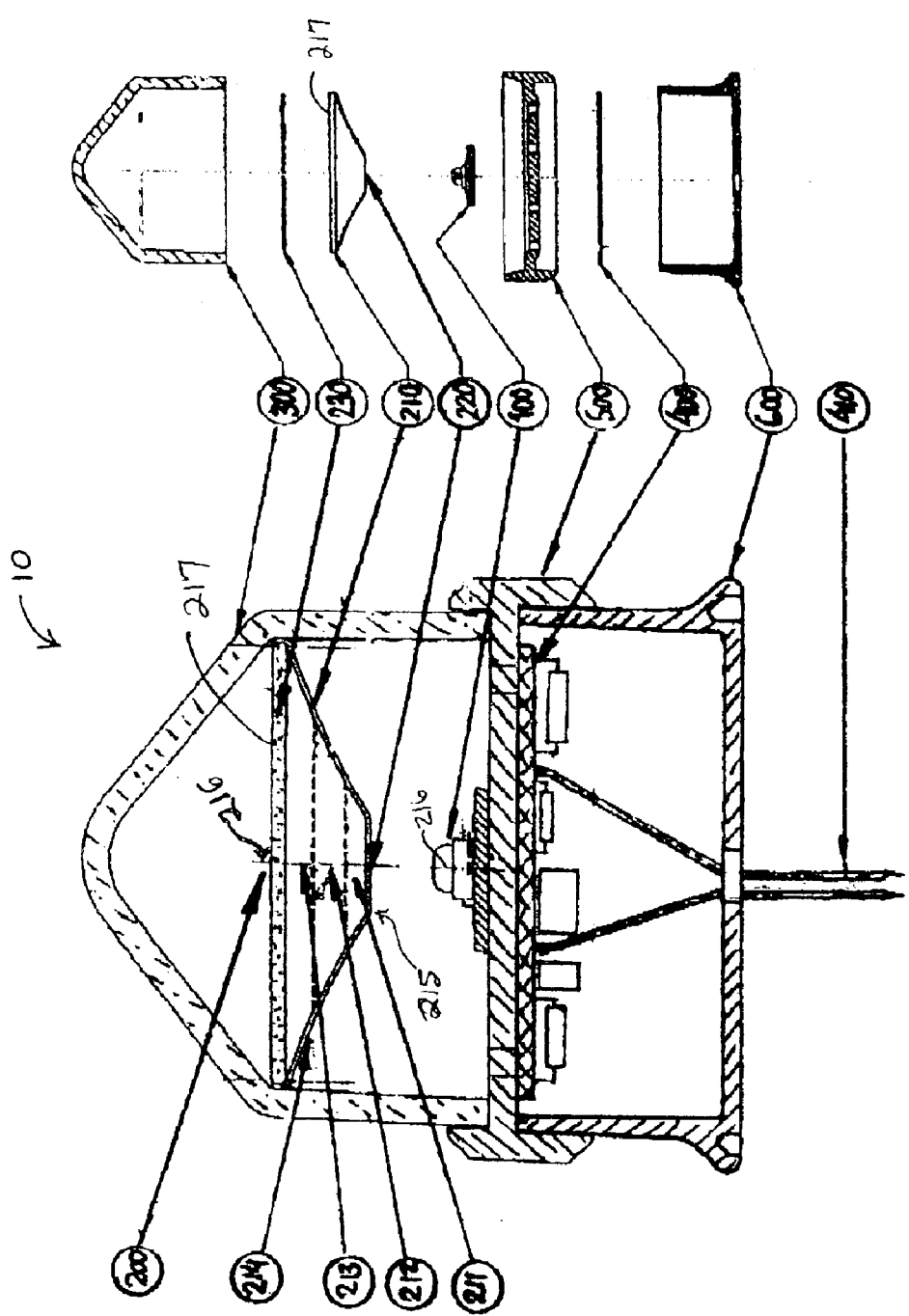
FIGS. 1A and 1B illustrate a cross-sectional view of a LED-based omnidirectional light constructed in accordance with the present invention.

Referring now to FIG. 1, an elevated omnidirectional luminaire 10 includes a single LED 100, a light transformer 200, a hemispherical optical window 300, an electric/electronic circuit 400, a base 500, and an adapter 600.

LED 100 emits light with a wide divergence, and light transformer 200 directs a significant portion of the light emitted by LED 100 in an omnidirectional pattern with a limited angle and a precalculated intensity distribution in the vertical plane, while the remaining emitted light is dispersed across the hemisphere.

Light transformer 200 is seated within hemispherical optical window 300 and transmits the light to the exterior of luminaire 10. Electric/electronic circuit 400 connects through an input 410 to an outside power source (not shown). Base 500 houses LED 100, optical window 300 and electric/electronic circuit 400 in a weatherproofed sealed arrangement. Adapter 600 is installed on a supporting structure (not shown).

Light transformer 200 includes a truncated hollow conical reflector 210 having a truncated end 215 facing LED 100. A cone axis 216 is coincident with the axis of LED 100. Curved reflective surface 214 has an arbitrary profile calculated to provide the required intensity distribution in an omnidirectional pattern based on a given LED 100's spatial intensity distribution.

Light transformer 200 further includes an opening 220 on truncated end 215 for light passing through hollow conical reflector 210, and an optical element 230 for dispersing the light passing through hollow cone 210 located at a cone base 217 in a plane perpendicular to cone axis 216.

A light shaping diffuser, particularly a holographic diffuser, may be used as dispersing optical element 230.

Light transformer 200 and curved reflective conical surface 214 may include a profile having multiple curved circular facets (211, 212, 213) with each facet calculated to reflect light emitted in different angles into the same limited angle omnidirectional pattern to provide the required intensity distribution.

Figure 2:
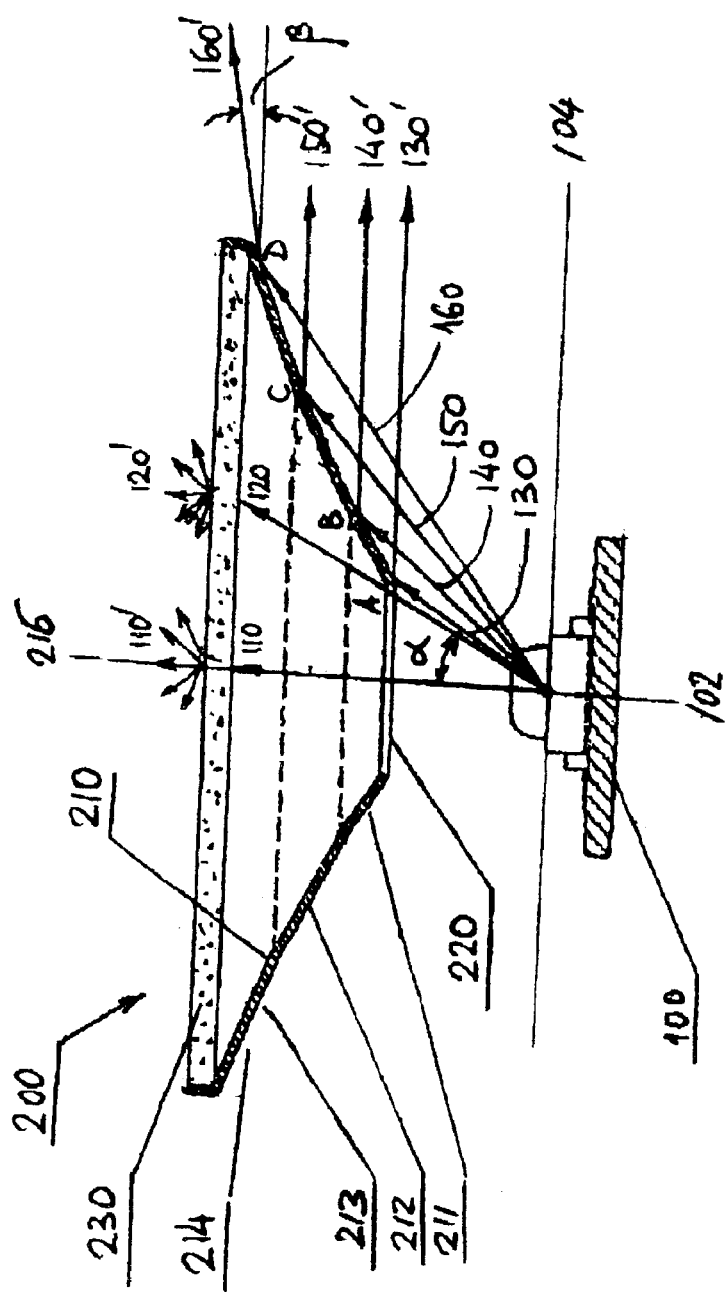
FIG. 2 illustrates a cross-sectional view of a light transformer in accordance with the present invention.

Referring now to FIG. 2, LED 100 emits light with wide divergence $2\alpha_{max}$ where $\alpha$ is the angle in the vertical plane with respect to LED's 100 optical axis 102, and:

$$\alpha_{max} = \alpha_A + \alpha_B + \alpha_C + \alpha_D,$$

where $\alpha_A$ is the angle between cone optical axis 216 coincidental with LED's axis 102 and direction to point A, located on the edge of opening 220;

$\alpha_B$, $\alpha_C$ and $\alpha_D$ are angles between cone optical axis 216 and direction to points A, B, C and D, respectively; and A, B, C and D are arbitrary points on cone 210 reflective surface 214.

All rays emitted by LED 100 in angle $\alpha_A$ (from a ray 110 to a ray 120) pass through opening 220 and disperse as a pattern 110' to 120' according to the diffusing property of optical element 230.

All other rays emitted by LED 100 are reflected from cone surface 214 in a direction determined by incident angle $\alpha$ and the local cone profile in each point of reflection. For example, rays 130, 140, 150 and 160 reflect respectively from points A, B, C and D in directions $\beta_A$, $\beta_B$, $\beta_C$ and $\beta_D$ as rays 130', 140', 150' and 160' respectively, wherein $\beta$ is the angle of reflection with respect to a horizontal axis 104 which is orthogonal to vertical optical axis 102.

Profile ABCD of curved reflective surface 214 reflects light into an omnidirectional pattern with a precalculated intensity distribution, which occurs as a result of the superposition of different rays reflected in one direction, e.g., intensity redistribution. The reflective surface 214 profile is calculated by the following steps:

1. receiving a maximum output angle and a minimum output angle;
2. receiving a location of a portion of the light transformer's surface with respect to the light source; and
3. iteratively point-by-point calculating the optical transformer reflective surface by providing an associated increment for an output angle for each increment of an input angle, the associated increment for the output angle being consistent with a predetermined output intensity distribution to reflect light provided by the light source according to the received maximum and minimum output angles based on the received location of a portion of the light transformer surface.

Alternatively, specifically when the angular dimension of the required omnidirectional pattern is smaller than LED 100's angular divergence, conical reflector 210 may have multiple curved circular facets 211, 212, 213 and each facet reflects light from different angles $\alpha$ into the same limited angle omnidirectional pattern.

For example, assume that the required omnidirectional pattern has an angular spread from horizontal ($\beta_{min}=0$) to $\beta_{max}$, and $$\alpha_{max} > \beta_{max}$$

The profile of conical reflector 210 may contain three circular curved facets: AB, BC and CD, wherein reflected rays 130', 140' and 150' are all directed in horizontal plane ($\beta_A=0$), ($\beta_B=0$) and ($\beta_C=0$), and ray 160' is directed in angle $\beta_D = \beta_{max}$. The profile of each facet is calculated according to the required distribution using procedure described above.

In a simple case, when the omnidirectional pattern does not require a specific intensity distribution, and there still is a limited angle in the vertical plane, the curved circular facets degenerate into plain circular facets. These facets just redirect light but they do not redistribute intensity, so that each facet duplicates the intensity distribution of LED 100 in a given specific angular spread.

For example, in this case, assuming profile BC is a linear profile, the outgoing rays between rays 140' and 150' will have exactly the same intensity distribution as rays emitted by LED 100 in angle $\alpha_C$ between rays 140 and 150.

The scope of the application is not to be limited by the description of the preferred embodiments described above, but is to be limited solely by the scope of the claims that follow. For example, LEDs can be replaced by an array of laser diodes or the LEDs can be substituted by plasma light sources with primary optics (e.g., a fusion light) without departing from the scope of the preferred embodiment of the present invention.

What is claimed is:

1. A light transformer for directing part of the light emitted by a light source in a limited angle uninterrupted uniform omnidirectional pattern with precalculated intensity distribution across the limited angle while the remaining emitted light is dispersed across a hemisphere comprising:

a truncated hollow conical reflector having a truncated end facing the light source and a cone base opposite the truncated end, wherein a conical reflector axis is coincident with a light source axis, and light passes through an opening on the truncated end;

a curved reflective surface between the truncated end and the cone base, wherein the surface reflects light from the light source with given particular spatial intensity distribution in the limited angle uninterrupted uniform omnidirectional pattern with precalculated intensity distribution across said limited angle, the profile of the curved reflective surface calculated as a function of both the light source and the required pattern intensity distribution; and an optical element adjacent the cone base in a plane perpendicular to the conical reflector axis, wherein the optical element disperses the light passing through the truncated hollow cone reflector in the remaining portion of hemisphere not covered with light reflected from the reflective surface.

2. A light transformer according to claim 1, wherein the curved reflective surface consists of a plurality of curved circular facets.

3. A light transformer according to claim 2, wherein each of the facets reflects light into the same limited angle omnidirectional pattern and superposition of rays reflected from the different facets forms the precalculated intensity distribution across said limited angle with the precalculated intensity distribution as a superposition of rays reflected from different facets.

4. A light transformer according to claim 1, wherein the curved reflective surface includes a plurality of plain circular facets and each of the facets reflects light from different angles into the same limited angle omnidirectional pattern.

5. A light transformer according to claim 1, wherein the optical element is a non-Lambertian diffuser.

6. A luminaire comprising:

a light source;

a light transformer including a truncated hollow conical reflector having a truncated end facing the light source and a cone base opposite the truncated end, wherein a conical reflector axis is coincident with a light source axis, and light passes through an opening on the truncated end;

a curved reflective surface between the truncated end and the cone base, wherein the surface reflects tight from the light source with given particular special intensity distribution in the limited angle uninterrupted uniform omnidirectional pattern with precalculated intensity distribution, and wherein the curved reflective surface consists of a plurality of curved circular facets, each of the facets reflecting light into the same limited angle omnidirectional pattern and superposition of rays reflected from different facets forms precalculated intensity distribution across said limited angle with precalculated intensity distribution as a superposition of rays reflected from different facets;

an optical element adjacent the cone base in a plane perpendicular to the conical reflector axis, wherein the optical element disperses the light passing through the truncated hollow cone reflector in the remaining portion of hemisphere not covered with light reflected form the reflective surface;

a plain hemispherical optical window, wherein the light transformer is seated within the window and the optical window transmits light to the exterior of the luminaire;

circuit connecting the light source to an outside power source; and a base housing the power source, the hemispherical optical window and the circuit.

7. A luminaire according to claim 6, wherein the light source is a LED.

8. A luminaire according to claim 6, wherein the base houses the power source, the hemispherical optical window and the circuit in a weatherproofed sealed arrangement.

9. A luminaire according to claim 6, further comprising an adapter for installation located opposite hemispherical optical window.

10. A luminaire according to claim 6, wherein the circuit is an electric or an electronic circuit.

11. A luminaire according to claim 10, wherein the circuit operates and interfaces with existing airport lighting infrastructures including intensity variation by constant current regulator compliance standard regulations.

12. A luminaire according to claim 6, wherein the optical element is a non-Lanibertian diffuser.

13. A luminaire according to claim 11, further comprising an autonomous power source including a rechargeable battery.

14. A light emitting apparatus comprising:

a light source;

a light transformer including a truncated hollow conical reflector having a truncated end facing the light source and a cone base opposite the truncated end, wherein a conical reflector axis is coincident with a light source axis, and light passes through an opening on the truncated end;

a curved reflective surface between the truncated end and the cone base, wherein the surface reflects light from the light source with given particular spatial intensity distribution in a limited angle uninterrupted uniform omnidirectional pattern with precalculated intensity distribution across said limited angle, the profile of the curved reflective surface calculated as a function of both the light source and the required pattern intensity distribution;

an optical element adjacent the cone base in a plane perpendicular to the conical reflector axis, wherein the optical element disperses the light passing through the truncated hollow cone reflector in the remaining portion of hemisphere not covered with reflected from the reflective surface;

a plain hemispherical optical window, wherein the light transformer is seated within the window and the optical window transmits light to the exterior of the light emitting apparatus;

a circuit connecting the light source to an outside power source; and a base housing the power source, the hemispherical optical window and the, circuit.

15. A light emitting apparatus according to claim 14, wherein the curved reflective surface consists of a plurality of curved circular facets, each of the facets reflecting light into the same limited angle omnidirectional pattern and superposition of rays reflected from different facets forms precalculated intensity distribution across said limited angle with precalculated intensity distribution as a superposition of rays reflected from different facets.

16. A light emitting apparatus according to claim 14, wherein the light source is a single LED.

17. A light emitting apparatus according to claim 14, further comprising an adapter for installation located opposite hemispherical optical window.

* * * * *